United States Patent [19]

Ryan

[11] Patent Number: 5,495,591
[45] Date of Patent: * Feb. 27, 1996

[54] METHOD AND SYSTEM FOR CACHE MISS PREDICTION BASED ON PREVIOUS CACHE ACCESS REQUESTS

[75] Inventor: Charles P. Ryan, Phoenix, Ariz.

[73] Assignee: Bull HN Information Systems Inc., Billerica, Mass.

[*] Notice: The portion of the term of this patent subsequent to Jun. 20, 2012, has been disclaimed.

[21] Appl. No.: 906,618

[22] Filed: Jun. 30, 1992

[51] Int. Cl.$^6$ ................................................. G06F 12/08
[52] U.S. Cl. ................... 395/421.03; 395/445; 395/600; 364/DIG. 1
[58] Field of Search .................... 395/375, 425, 395/600, 445, 421.03; 364/DIG. 1; 382/15, 37, 42

[56] References Cited

U.S. PATENT DOCUMENTS

| | | | |
|---|---|---|---|
| 4,689,760 | 8/1987 | Lee et al. | 370/110.3 |
| 4,712,108 | 12/1987 | Schwab | 342/26 |
| 4,805,225 | 2/1989 | Clark | 382/15 |
| 4,943,908 | 7/1990 | Emma et al. | 395/375 |
| 5,067,166 | 11/1991 | Ito | 382/37 |
| 5,133,052 | 7/1992 | Bier et al. | 395/155 |
| 5,165,030 | 11/1992 | Barker | 395/500 |
| 5,194,864 | 3/1993 | Nakano | 341/106 |
| 5,226,165 | 7/1993 | Martin | 395/600 |
| 5,233,702 | 8/1993 | Emma et al. | 395/445 |
| 5,247,647 | 9/1993 | Brown et al. | 395/180 |
| 5,325,484 | 6/1994 | Motoyama | 395/162 |
| 5,416,896 | 5/1995 | Motoyama | 395/145 |
| 5,426,764 | 6/1995 | Ryan | 395/425 |

Primary Examiner—Tod R. Swann
Assistant Examiner—B. James Peikari
Attorney, Agent, or Firm—J. Solakian; J. Phillips

[57] ABSTRACT

For a data processing system which employs a cache memory, the disclosure includes both a method for lowering the cache miss ratio for requested operands and an example of special purpose apparatus for practicing the method. Recent cache misses are stored in a first in, first out miss stack, and the stored addresses are searched for displacement patterns thereamong. Any detected pattern is then employed to predict a succeeding cache miss by prefetching from main memory the signal identified by the predictive address. The apparatus for performing this task is preferably hard wired for speed purposes and includes subtraction circuits for evaluating variously displaced addresses in the miss stack and comparator circuits for determining if the outputs from at least two subtraction circuits are the same, indicating a pattern which yields information which can be combined with an address in the stack to develop a predictive address. The efficiency of the apparatus is improved by placing a series of "select pattern" values representing the search order for trying patterns into a register stack and providing logic circuitry by which the most recently found "select pattern" value is placed at the top of the stack with the remaining "select pattern" values pushed down accordingly.

3 Claims, 3 Drawing Sheets

METHOD AND SYSTEM FOR CACHE MISS PREDICTION BASED ON PREVIOUS CACHE ACCESS REQUESTS

FIELD OF THE INVENTION

This invention relates to the art of data processing systems which include a cache memory feature and, more particularly, to a method and apparatus for optimizing the pattern search used in selectively predicting memory cache misses for operand calls and using this information to transfer data from a main memory to cache memory to thereby lower the cache miss ratio.

BACKGROUND OF THE INVENTION

The technique of employing a high speed cache memory between a processor and a main memory to hold a dynamic subset of the information in the main memory in order to speed up system operation is well known in the art. Briefly, the cache holds a dynamically variable collection of main memory information fragments selected and updated such that there is a good chance that the fragments will include instructions and/or data required by the processor in upcoming operations. If there is a cache "hit" on a given operation, the information is available to the processor much faster than if main memory had to be accessed to obtain the same information. Consequently, in many high performance data processing systems, the "cache miss ratio" is one of the major limitations on the system execution rate, and it should therefore be kept as low as possible.

The key to obtaining a low cache miss ratio is obviously one of carefully selecting the information to be placed in the cache from main memory at any given instant. There are several techniques for selecting blocks of instructions for transitory residence in the cache, and the more or less linear use of instructions in programming renders these techniques statistically effective. However, the selection of operand information to be resident in cache memory at a given instant has been much less effective and has been generally limited to transferring one or more contiguous blocks including a cache miss address. This approach only slightly lowers the cache miss ratio and is also an ineffective use of cache capacity.

Thus, those skilled in the art will understand that it would be highly desirable to provide means for selecting operand information for transitory storage in a cache memory in such a manner as to significantly lower the cache miss ratio. That end was accomplished in accordance with the invention disclosed and claimed in U.S. patent application Ser. No. 07/364,943 filed Jun. 12, 1989, for CACHE MISS PREDICTION METHOD AND APPARATUS by Charles P. Ryan, now U.S. Pat. No. 5,093,777, by special purpose apparatus in the cache memory which stores recent cache misses and searches for operand patterns therein. Any detected operand pattern is then employed to anticipate a succeeding cache miss by prefetching from main memory the block containing the predicted cache miss.

However, the method and apparatus disclosed therein had the inherent drawback that the patterns are always searched in the same sequence. If, for example, the pattern found is the last of eight searched, it would always require seven search cycles to find the pattern, a fact which adversely affects the advantage of prefetching the next request. The present invention overcomes this drawback.

Inventions which address other improvements to the invention disclosed and claimed in U.S. Pat. No. 5,093,777 are discussed immediately below for their peripheral relevance to the present invention.

Under certain operating conditions, the full time use of the procedure disclosed and claimed in U.S. Pat. No. 5,093,777 can actually raise the long term miss ratio (i.e., lower the long term hit ratio). In a typical cache based processor that executes a single process during a given period, the cache hit ratio will stabilize after some time interval following the institution of the process. If a change to another process is made, new instructions and data must be loaded into the cache such that cache hit ratio instantaneously drops dramatically and then increases as the new process is "experienced". If the cache miss prediction mechanism is in operation, the initial rate of increase in the cache hit ratio is much faster. However, the hit ratio never reaches the level it would reach in the long term if the cache miss prediction mechanism was not in use. This result is caused by the fact that the cache miss prediction mechanism continues to find and load from main memory the next possible miss which, however, is not used, thus forcing the cache to replace blocks that are more important.

The invention disclosed and claimed in U.S. patent application Ser. No. 07/841,687 filed Feb. 26, 1992, for SELECTIVELY ENABLED CACHE MISS PREDICTION METHOD AND APPARATUS by Charles P. Ryan overcomes the limiting effect of using the cache miss prediction mechanism continuously after a process has been changed by selectively enabling the cache miss prediction mechanism only during cache "in-rush" following a process change to increase the recovery rate; thereafter, it is disabled, based upon timing-out a timer or reaching a hit ratio threshold, in order that normal procedures allow the hit ratio to stabilize at a higher percentage than if the cache miss prediction mechanism were operated continuously.

There are operating conditions, however, under which it would be advantageous to have the cache miss prediction mechanism in operation even after cache inrush following a process change. An example of such an operating condition occurs when very large sets (even in excess of the cache size) of regularly addressed operand data (matrix/vector/ strings) are used by a procedure. An invention which takes advantage of this characteristic is disclosed in U.S. patent application Ser. No. 07/850,713 filed Mar. 13, 1992, for CONTROLLING CACHE PREDICTIVE PREFETCHING BASED ON CACHE HIT RATIO TREND (as amended) by Charles P. Ryan, now U.S. Pat. No. 5,367,656. This feature is achieved by special purpose apparatus which stores recent cache misses and searches for address patterns therein. Any detected pattern is then employed to anticipate a succeeding cache miss by prefetching from main memory the block containing the predicted cache miss. The cache miss prediction mechanism is selectively enabled by an adaptive circuit that develops a short term operand cache hit ratio history and responds to ratio improving and ratio deteriorating trends by accordingly enabling and disabling the cache miss prediction mechanism.

OBJECTS OF THE INVENTION

It is therefore a broad object of this invention to provide an improved cache memory in a data processing system.

It is another object of this invention to provide a cache memory particularly characterized by exhibiting a lower cache miss ratio in operation when operand blocks are being requested.

It is a more specific object of this invention to provide a cache memory incorporating cache miss prediction method and apparatus which includes a feature for improving the search pattern selection used in selectively enabling circuitry for predicting such operand cache misses.

SUMMARY OF THE INVENTION

Briefly, these and other objects of the invention are achieved by special purpose apparatus which stores recent cache misses and searches for address patterns therein. Any detected pattern is then employed to anticipate a succeeding cache miss by prefetching from main memory the block containing the predicted cache miss. The efficiency of the apparatus is improved, according to the invention, by placing the search order for trying patterns into a register stack and providing logic circuitry by which the most recently found select pattern value is placed on top the stack with the remaining select pattern values pushed down accordingly.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

DETAILED DESCRIPTION OF THE INVENTION

Figure 1:
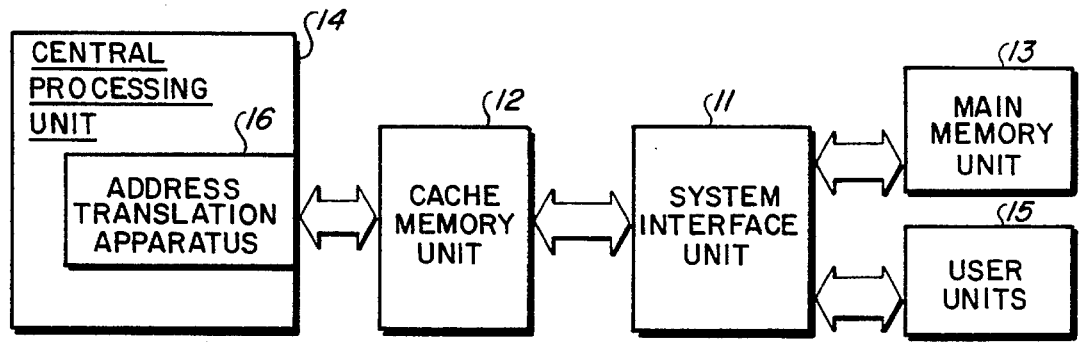
FIG. 1 is a generalized block diagram of a typical data processing system employing a cache memory and therefore constituting an exemplary environment for practicing the invention.

Referring now to FIG. 1, there is shown a high level block diagram for a data processing system incorporating a cache memory feature. Those skilled in the art will appreciate that this block diagram is only exemplary and that many variations on it are employed in practice. Its function is merely to provide a context for discussing the subject invention. Thus, the illustrative data processing system includes a main memory unit 13 which stores the data signal groups (i.e., information words, including instructions and operands) required by a central processing unit 14 to execute the desired procedures. Signal groups with an enhanced probability for requirement by the central processing unit 14 in the near term are transferred from the main memory unit 13 (or a user unit 15) through a system interface unit 11 to a cache memory unit 12. (Those skilled in the art will understand that, in some data processing system architectures, the signal groups are transferred over a system bus, thereby requiring an interface unit for each component interacting with the system bus.) The signal groups are stored in the cache memory unit 12 until requested by the central processing unit 14. To retrieve the correct signal group, address translation apparatus 16 is typically incorporated to convert a virtual address (used by the central processing unit 14 to identify the signal group to be fetched) to the real address used for that signal group by the remainder of the data processing system to identify the signal group.

The information stored transiently in the cache memory unit 14 may include both instructions and operands stored in separate sections or stored homogeneously. Preferably, in the practice of the present invention, instructions and operands are stored in separate (at least in the sense that they do not have commingled addresses) memory sections in the cache memory unit 14 inasmuch as it is intended to invoke the operation of the present invention as to operand information only.

The cache miss prediction mechanism which is an aspect of the invention is based on recognizing and taking advantage of sensed patterns in cache misses resulting from operand calls. In an extremely elementary example, consider a sensed pattern in which three consecutive misses ABC are, in fact, successive operand addresses with D being the next successive address. This might take place, merely by way of example, in a data manipulation process calling for successively accessing successive rows in a single column of data. If this pattern is sensed, the likelihood that signal group D will also be accessed, and soon, is enhanced such that its prefetching into the cache memory unit 14 is in order.

Figure 2:
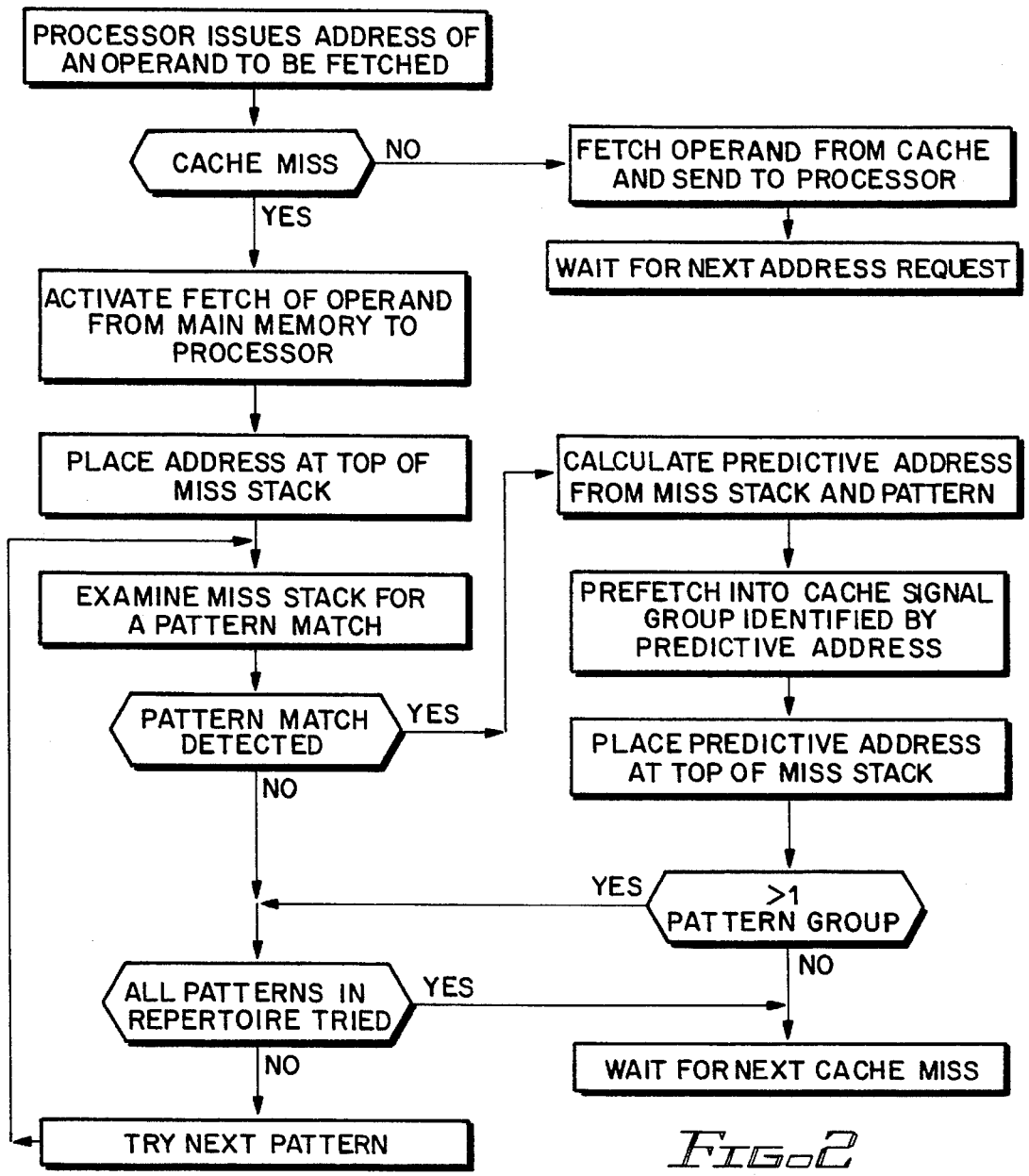
FIG. 2 is a flow diagram illustrating, in simplified form, the basic sequence of operations of the cache miss prediction apparatus.

The fundamental principles of the cache miss prediction mechanism are set forth in the operational flow chart of FIG. 2. When a processor (or other system unit) asks for an operand, a determination is made as to whether or not the operand is currently resident in the cache. If so, there is a cache hit (i.e., no cache miss), the operand is sent to the requesting system unit and the next operand request is awaited. However, if there is a cache miss, the request is, in effect, redirected to the (much slower) main memory.

Those skilled in the art will understand that the description to this point of FIG. 2 describes cache memory operation generally. In the context of the present invention, however, the address of the cache miss is meaningful. It is therefore placed at the top of a miss stack to be described in further detail below. The miss stack (which contains a history of the addresses of recent cache misses in consecutive order) is then examined to determine if a first of several patterns is present. This first pattern might be, merely by way of example, contiguous addresses for the recent cache misses. If the first pattern is not sensed, additional patterns are tried. Merely by way of example again, a second pattern might be recent cache misses calling for successive addresses situated two locations apart. So long as there is no pattern match, the process continues through the pattern repertoire. If there is no match when all patterns in the repertoire have been examined, the next cache miss is awaited to institute the process anew.

However, if a pattern in the repertoire is detected, a predictive address pointed to a signal group stored in the main memory is calculated from the information in the miss stack and from the sensed pattern. This predictive address is then employed to prefetch from main memory into cache the signal group identified by the predictive address. In the elementary example previously given, if a pattern is sensed in which consecutive operand cache miss operand addresses ABC are consecutive and contiguous, the value of the predictive address, D, will be C+1.

In order to optimize the statistical integrity of the miss stack, the predictive address itself may be placed at the top of the stack since it would (highly probably) itself have been the subject of a cache miss if it had not been prefetched in accordance with the invention.

Since speed of operation is essential, the cache miss prediction mechanism may advantageously be embodied in a "hard wired" form (e.g., in a gate array) although firmware control is contemplated. Consider first a relatively simple hardwired implementation shown in FIG. 3. A miss stack 20 holds the sixteen most recent cache miss addresses, the oldest being identified as address P with entry onto the stack being made at the top. Four four-input electronic switches 21, 22, 23, 24 are driven in concert by a shift pattern signal via line 25 such that: in a first state, addresses A, B, C, D appear at the respective outputs of the switches; in a second state, addresses B, D, F, H appear at the outputs; in a third state, addresses C, F, I, L appear at the outputs; and in a fourth state, addresses D, H, L, P appear at the outputs. Subtraction circuits 26, 27, 28 are connected to receive as inputs the respective outputs of the electronic switches 21, 22, 23, 24 such that: the output from the subtraction circuit 26 is the output of the switch 21 minus the output of the switch 22; the output from the subtraction circuit 27 is the output of the switch 22 minus the output of the switch 23; and the output from the subtraction circuit 28 is the output of the switch 23 minus the output of the switch 24.

The output from the subtraction circuit 26 is applied to one input of an adder circuit 31 which has its other input driven by the output of the electronic switch 21. In addition, the output from the subtraction circuit 26 is also applied to one input of a comparator circuit 29. The output from the subtraction circuit 27 is applied to the other input of the comparator circuit 29 and also to one input of another comparator circuit 30 which has its other input driven by the output of the subtraction circuit 28. The outputs from the comparator circuits 29, 30 are applied, respectively, to the two inputs of an AND-gate 32 which selectively issues a prefetch enable signal.

Figure 3:
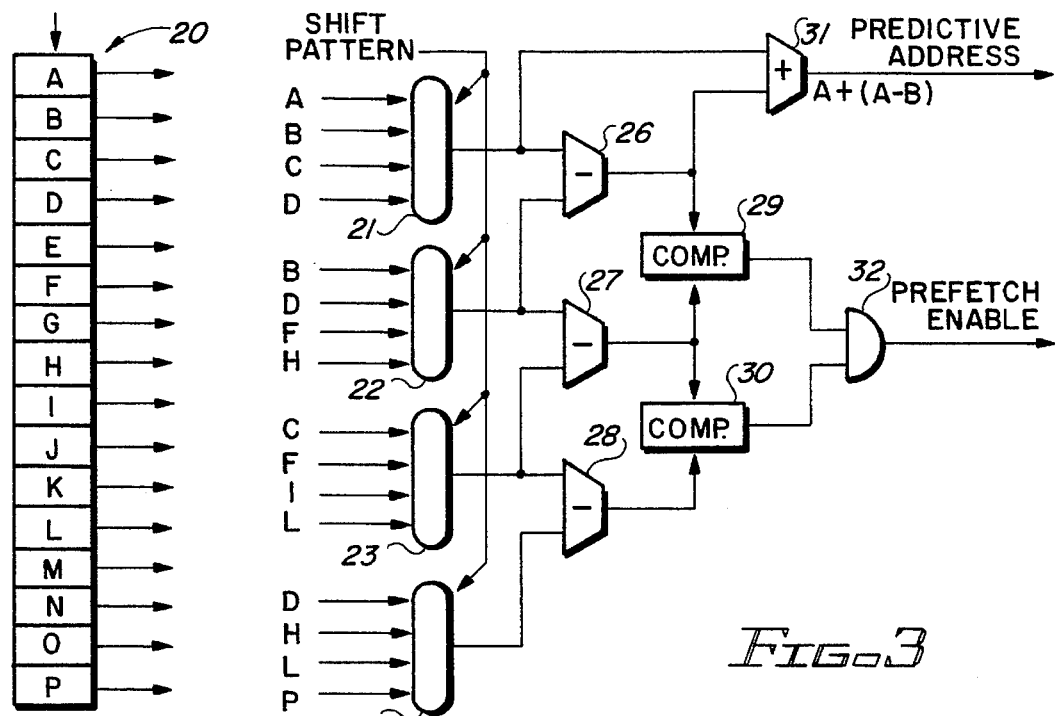
FIG. 3 is a logic diagram of a simple exemplary embodiment of the cache miss prediction apparatus.

Consider now the operation of the circuit shown in FIG. 3. As previously noted, miss stack 20 holds the last sixteen cache miss addresses, address A being the most recent. When the request for the signal group identified by address A results in a cache miss, circuit operation is instituted to search for a pattern among the addresses resident in the miss stack. The electronic switches 21, 22, 23, 24 are at their first state such that address A is passed through to the output of switch 21, address B appears at the output of switch 22, address C appears at the output of switch 23 and address D appears at the output of switch 24. If the differences between A and B, B and C, and C and D are not all equal, not all the outputs from the subtraction circuits 26, 27, 28 will be equal such that one or both the comparator circuits 29, 30 will issue a no compare; and AND-gate 32 will not be enabled, thus indicating a "no pattern match found" condition.

The switches are then advanced to their second state in which addresses B, D, F, H appear at their respective outputs. Assume now that (B–D)=(D–F)=(F–H); i.e., a sequential pattern has been sensed in the address displacements. Consequently, both the comparators 29, 30 will issue compare signals to fully enable the AND-gate 32 and produce a prefetch enable signal. Simultaneously, the output from the adder circuit 31 will be the predictive address (B+(B–D)). It will be seen that this predictive address extends the sensed pattern and thus increases the probability that the prefetched signal group will be requested by the processor, thereby lowering the cache miss ratio.

If a pattern had not have been sensed in the address combination BDFH, the electronic switches would have been advanced to their next state to examine the address combination CFIL and then on to the address combination DHLP if necessary. If no pattern was sensed, the circuit would await the next cache miss which will place a new entry at the top of the miss stack and push address P out the bottom of the stack before the pattern match search is again instituted.

Figure 4:
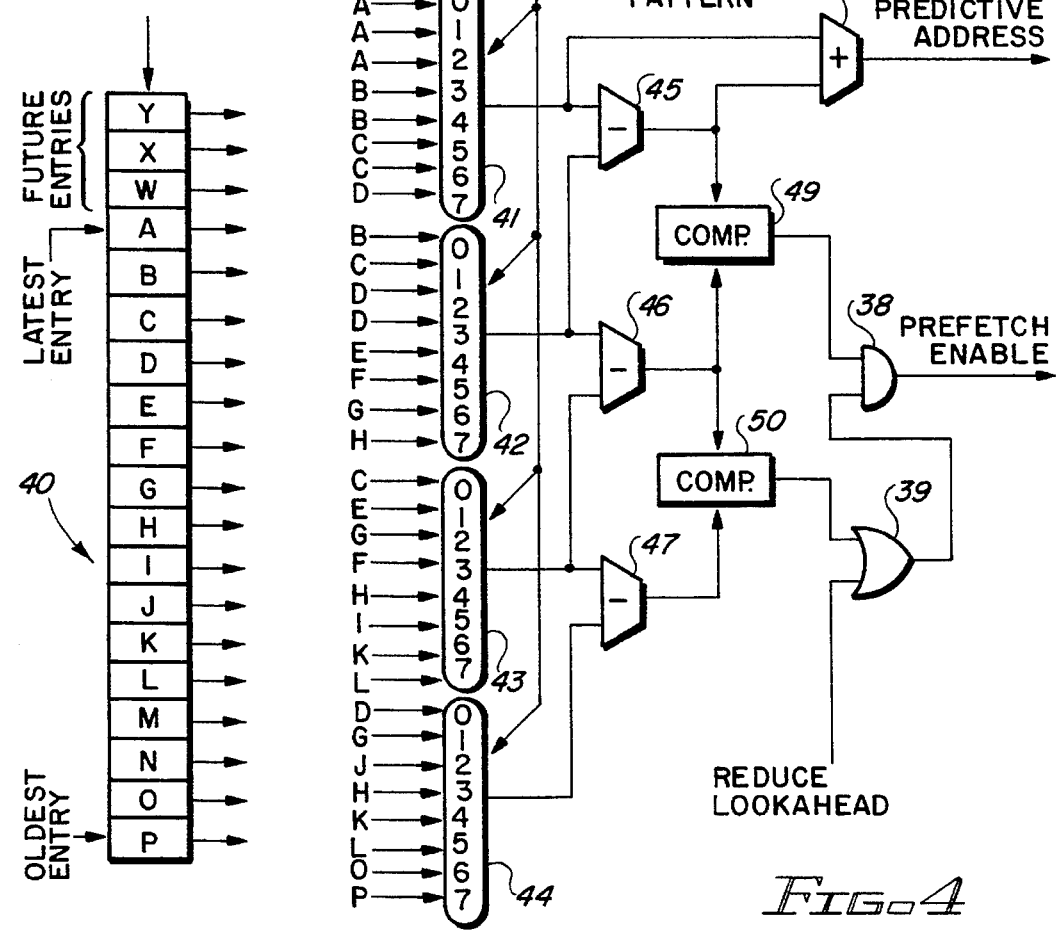
FIG. 4 is a logic diagram of a more powerful exemplary embodiment of the cache miss prediction apparatus.

Consider now the somewhat more complex and powerful embodiment of the cache miss prediction mechanism illustrated in FIG. 4. Electronic switches 41, 42, 43, 44 receive at their respective inputs recent cache miss addresses as stored in the miss stack 40 in the exemplary arrangement shown. It will be noted that each of the electronic switches 41, 42, 43, 44 has eight inputs which can be sequentially selectively transferred to the single outputs under the influence of the shift pattern signal. It will also be noted that the miss stack 40 stores, in addition to the sixteen latest cache miss addresses A–P, three future entries WXY. Subtraction circuits 45, 46, 47 perform the same office as the corresponding subtraction circuits 26, 27, 28 of the FIG. 3 embodiment previously described. Similarly, adder circuit 48 corresponds to the adder circuit 31 previously described.

Comparator circuit 49 receives the respective outputs of the subtraction circuits 45, 46, and its output is applied to one input of an AND-gate 38 which selectively issues the prefetch enable signal. Comparator circuit 50 receives the respective outputs of the subtraction circuits 46, 47, but, unlike its counterpart comparator 30 of the FIG. 3 embodiment, its output is applied to one input of an OR-gate 39 which has its other input driven by a reduce lookahead signal. The output of OR-gate 39 is coupled to the other input of AND-gate 38. With this arrangement, activation of the reduce lookahead signal enables OR-Gate 39 and partially enables AND-gate 38. The effect of applying the reduce lookahead signal is to compare only the outputs of the subtraction circuits 45, 46 in the comparator circuit 49 such that a compare fully enables the AND-gate 38 to issue the prefetch enable signal. This mode of operation may be useful, for example, when the patterns seem to be changing every few cache misses, and it favors the most recent examples.

With the arrangement of FIG. 4, it is advantageous to try all the patterns within pattern groups (as represented by the "YES" response to the ">1 PATTERN GROUP?" query in the flow diagram of FIG. 2) even if there is a pattern match detected intermediate the process. This follows from the fact that more than one of the future entries WXY to the miss stack may be developed during a single pass through the pattern repertoire or even a subset of the pattern repertoire. With the specific implementation of FIG. 4 (which is only exemplary of many possible useful configurations), the following results are obtainable:

| SWITCH STATE | PATTERN | GOAL |
|---|---|---|
| 0 | ABCD | W |
| 1 | ACEG | X |
| 2 | ADGJ | Y |
| 3 | BDFH | W |
| 4 | BEHK | X |
| 5 | CFIL | W |
| 6 | CGKO | X |
| 7 | DHLP | W |

The goal states are searched in groups by switch state; i.e.: Group 1 includes switch states 0, 1, 2 and could result in filling future entries WXY; Group 2 includes states 3, 4 and could result in filling entries WX; Group 3 includes states 5, 6 and could also result in filling entries WX; and Group 4 includes state 7 and could result in filling entry W. When a goal state is reached that has been predicted, the search is halted for the current cache miss; i.e., it would not be desirable to replace an already developed predictive address W with a different predictive address W.

Those skilled in the art will understand that the logic circuitry of FIGS. 3 and 4 is somewhat simplified since multiple binary digit information is presented as if it were single binary digit information. Thus, in practice, arrays of electronic switches, gates, etc. will actually be employed to handle the added dimension as may be necessary and entirely conventionally. Further, timing signals and logic for incorporating the cache miss prediction mechanism into a given data processing system environment will be those appropriate for that environment and will be the subject of straightforward logic design.

Figure 5:
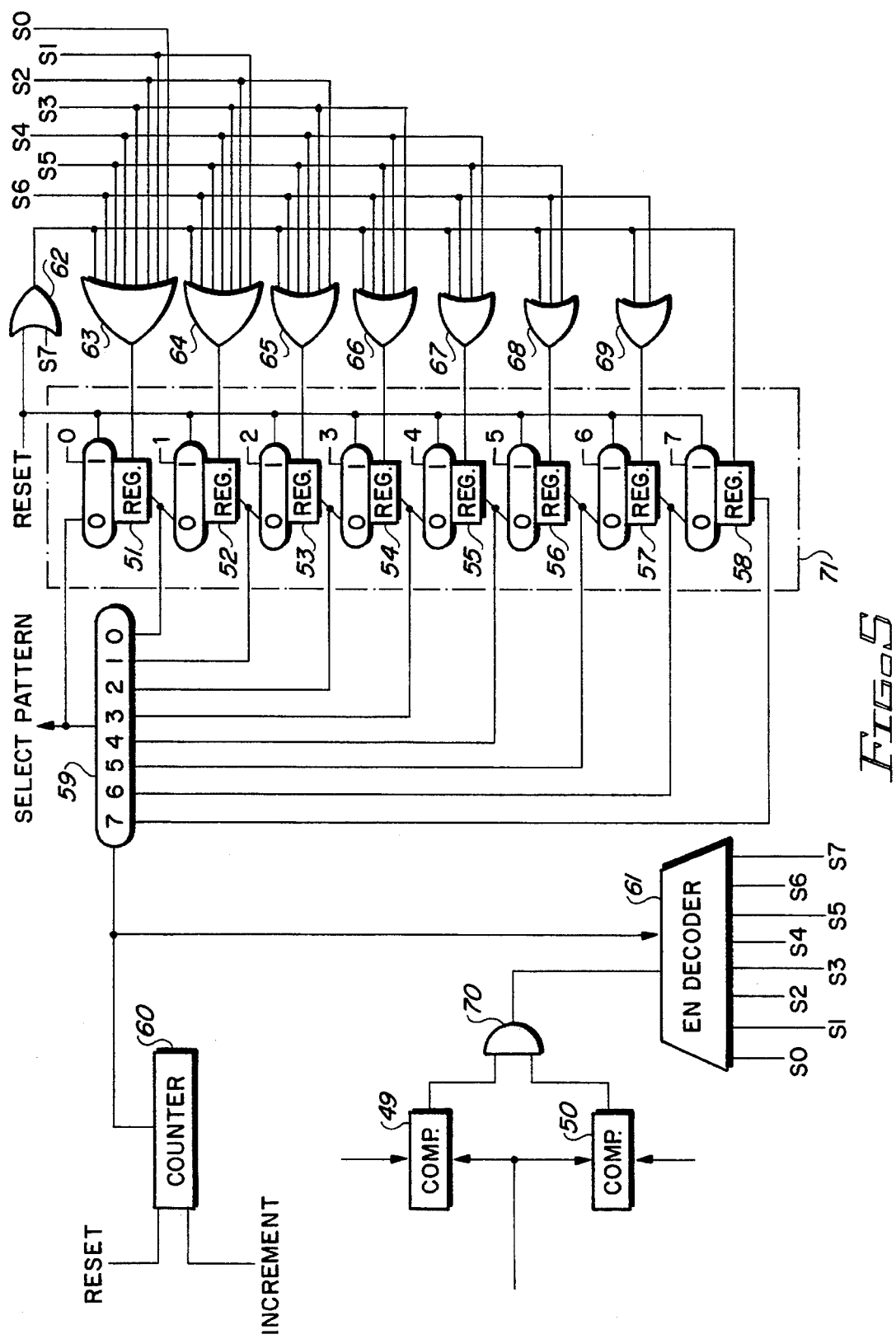
FIG. 5 is a logic diagram of a search pattern optimizer incorporated into the cache miss prediction apparatus according to the present invention.

The foregoing discussion relates to the invention disclosed and claimed in the above-referenced U.S. Pat. No. 5,093,777 which forms an exemplary environment for the present invention. Attention is now directed to FIG. 5 which is a logic diagram of exemplary control apparatus for improving the hit ratio by controlling the order in which patterns are searched for.

Referring again briefly to FIGS. 3 and 4, those skilled in the art will understand that the shift pattern signal may be readily supplied by a simple stepped counter, two-bits wide in the FIG. 3 embodiment and three-bits wide in the FIG. 4 embodiment to supply, respectively, the four and eight patterns to be searched for consecutively. However, as previously discussed, this arrangement requires that the first pattern is always tried first, the second pattern second, and so on. If, merely by way of example, an operand pattern of stored information is predominantly one of the later patterns looked for, say the last, then considerable time is repeatedly spent in first looking through all the other patterns which will not match. The logic circuit of FIG. 5 addresses this limitation and adaptively eliminates it.

Thus, referring to FIG. 5, an eight pattern exemplary embodiment, as would be used with the circuitry of FIG. 4, of the search optimizer is shown. The circuitry is initialized with a reset signal in the usual manner. At that time, eight three-bit registers, 51–58 are forced to select the "1" input which, in each case, is hardwired to apply the preset count indicated. The reset signal also enables OR-gate 62 which, in turn, enables each of OR-gates 63–69 and directly clocks register 58. Thus, the preset count applied to each of the registers 51–58 is clocked into the respective register; i.e., register 51 to "000" register 52 to "001", register 53 to "010", etc. This step establishes the initial search order for the patterns such that any search would examine the patterns in the sequence: 0, 1, 2, 3, 4, 5, 6, 7.

The registers 51–58, taken together, may be considered a push down sequence stack 71. The values held in each of the registers 51–58 are applied to the eight inputs to a switch 59. In addition, the values held in registers 51–57, respectively, are applied to the "0" inputs of registers 52–58.

When the circuit of FIG. 4 requires the shift pattern signal, it is supplied, as the "select pattern" signal, by the one-of-eight switch 59 which serves to issue one of the values contained in the registers 51–58 under control of the three-bit counter 60. Counter 60 is initialized to "000" by the reset signal and incremented after every search cycle. It may be noted at this point that counter 60 is exemplary of one which can be employed to directly supply the shift pattern signal to the circuit of FIG. 4 in an embodiment of the cache miss prediction apparatus which does not incorporate the logic circuit of FIG. 5. Further, as already noted, the switch 59 will, immediately after initialization, issue a series of select pattern signals which will be in the same 0, 1, 2, 3, 4, 5, 6, 7, 0, 1, 2, etc. sequence.

But, consider now the effect of the circuitry of FIG. 4 finding a pattern, say the one enabled by the value held in register 54 (i.e., "011") on the circuitry of FIG. 5. (Referring briefly to FIG. 4, this corresponds to the actual pattern BDFH.) Since both comparators 49 and 50 issue compare signals as previously described, the AND-gate 70 is enabled to enable a decoder 61 which therefore issues the S3 signal because the instantaneous count in the counter 60 is "011".

The S3 signal, in turn, enables OR-gates 63, 64, 65, 66 to clock the registers 51, 52, 53, 54. Therefore, the registers 51, 52, 53, 54 clock in new values, the registers 52, 53, 54 assuming the values previously held in the registers 51, 52, 53, respectively, and the register 51 assuming the value of the select pattern signal; i.e., "011" which is the same value previously resident in the register 54.

The effect of this event is that the next search sequence will be 3, 0, 1, 2, 4, 5, 6, 7 to favor the most recently found pattern. If a subsequent pattern found is not BDFH and is, merely by way of example, CGKO, then the S6 signal, issued by the decoder 61 in response to the enable signal from the AND-gate 70 and the value "110" from the counter 60, will enable OR-gates 63–69 to clock the registers 51–57. Thus, the value "110" will be placed into the register 51, and the values previously resident in the registers 51–56 will be transferred to the registers 52–57, respectively, thereby revising the search pattern to 6, 3, 0, 1, 2, 4, 5, 7. This optimization process will continue, each newly found pattern causing the corresponding select pattern value to go to the "top of the stack", the rest being pushed down in the stack of registers 51–58 as appropriate, until the circuit is reinitialized whereupon 0, 1, 2, 3, 4, 5, 6, 7 will be reestablished as a starting sequence.

While the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. An operand cache miss prediction method for selectively predicting operand memory request addresses from previous operand memory requests which resulted in cache misses, which method is used in a data processing system, said data processing system incorporating a processor for running successive processes, a cache memory and a main memory, the method comprising:

during the system design procedure, performing the preliminary steps of:
 A) establishing a first in, first out miss stack for storing a plurality of operand memory addresses referenced by operand memory requests which resulted in cache misses; and
 B) establishing a sequence stack for storing a plurality of identifier values representing a corresponding plurality of operand memory address patterns comprising a repertoire;

and, during system operation, performing the following steps within the system:
 C) establishing in the sequence stack a first sequence for searching the repertoire for a match;

D) when an operand memory request cache miss occurs, calling the requested information from main memory into cache and placing the operand memory address of the requested information in the miss stack;

E) searching, in the sequence stored in the sequence stack, the miss stack for a pattern among the operand memory addresses resident therein;

F) if the searching step of E) does not reveal a match for an address pattern, returning to step D);

G) if the searching step of F) reveals a match for a pattern:
 1) using the pattern which was matched and at least one of the operand memory addresses resident in the miss stack to calculate a predictive memory address;
 2) prefetching into cache memory from the main memory the signal group identified by the predictive memory address;
 3) placing in the sequence stack the identifier value of the pattern which was matched such that the pattern which was matched will be tried first during a succeeding search of the repertoire during step E); and
 4) returning to step D).

2. An operand cache miss prediction method for selectively predicting operand memory request addresses from previous operand memory requests which resulted in cache misses, which method is used in a data processing system, said data processing system incorporating a processor for running successive processes, a cache memory and a main memory, the method comprising:

during the system design procedure, performing the preliminary steps of:
 A) establishing a first in, first out miss stack for storing a plurality of operand memory addresses referenced by operand memory requests which resulted in cache misses; and
 B) establishing a sequence stack for storing a plurality of identifier values representing a corresponding plurality of operand memory address patterns comprising a repertoire, the repertoire being divided into a plurality of groups of patterns;

and, during system operation, performing the following steps within the system:
 C) selecting, from among the plurality of groups comprising the repertoire, a current group;
 D) establishing in the sequence stack a first sequence for searching the current group in the repertoire for a match;
 E) when an operand memory request cache miss occurs, calling the requested information from main memory into cache and placing the operand memory address of the requested information in the miss stack;
 F) selecting a pattern in the current group;
 G) searching, in the sequence stored in the sequence stack, the miss stack for a match with a selected pattern among the operand memory addresses resident therein;
 H) if the searching step of G) does not reveal a match for the selected pattern, determining if all the patterns in the current group have been tried;
 I) if all the patterns in the current group have not been tried, selecting, from the current group, the next sequential pattern identified by the sequence stack, and returning to step G);
 J) if all the patterns in all the groups in the repertoire have been searched, returning to step C);
 K) if all the patterns in the current group have been tried, assigning a new group, different from the group last examined, as the current group, and returning to step D);
 L) if the searching step of G) reveals a match for the selected pattern:
  1) using the selected pattern and at least one of the operand memory addresses resident in the miss stack to calculate a predictive memory address;
  2) prefetching into cache memory from the main memory the signal group identified by the predictive memory address;
  3) placing in the sequence stack the identifier value of the selected pattern such that the selected pattern will be tried first during a succeeding search of the current group; and
  4) returning to step E).

3. A data processing system including a processor for running successive processes, a cache memory, a main memory and an operand address prediction mechanism for developing a predictive address for prefetching signal groups, each signal group identified by an address, from the main memory into the cache memory, which operand address prediction mechanism comprises:

A) a first in, first out miss stack for storing a plurality of operand memory addresses representing operand memory requests which resulted in cache misses;

B) a sequence stack comprising a plurality of registers for storing a plurality of identifier values representing a corresponding plurality of operand memory address patterns comprising a repertoire;

C) a plurality of electronic switch means each having a plurality of address inputs and a single address output;

D) means coupling said operand memory addresses stored in said miss stack individually to said electronic switch means inputs in predetermined orders;

E) search means for switching said electronic switch means to transfer said addresses applied to said electronic switch means inputs to said electronic switch means outputs in sequential patterns specified by the order of said identifier values stored in said plurality of registers of said sequence stack to establish at said electronic switch means outputs predetermined combinations of said operand memory addresses;

F) at least two subtraction circuit means, each said subtraction circuit means being coupled to receive a unique pair of operand memory addresses from said electronic switch means outputs and to issue a displacement value representing the displacement therebetween;

G) at least one comparator circuit means coupled to receive a pair of outputs from a corresponding pair of said subtraction circuit means and responsive thereto for issuing a prefetch enable logic signal if there is a compare condition;

H) predictive address development means adapted to combine one of said operand memory addresses appearing at one of said electronic switch means outputs and said displacement value issued by one of said subtraction circuit means to obtain a predictive address; whereby, the coordinated presence of said predictive address and said prefetch enable logic signal causes a signal group identified by said predictive address to be prefetched from said main memory into said cache memory; and I) search order revision means responsive to the issuance of said prefetch enable logic signal for establishing a revised sequence for transferring said operand memory addresses applied to said electronic switch means inputs to said electronic switch means outputs by placing a specific identifier value representing the operand memory address which resulted in the issuance of said prefetch enable logic signal onto the top of said sequence stack and correspondingly pushing down all identifier values stored above the one of said registers previously storing said specific identifier value such that a revised sequence is developed each time a prefetch enable logic signal issues as a result of searching an address pattern other than the address pattern represented by an identifier value stored in a register at the top of said register stack.

* * * * *